United States Patent
Eo et al.

(10) Patent No.: US 12,407,096 B2
(45) Date of Patent: Sep. 2, 2025

(54) RADIOMETER FOR MICROWAVE RECEIVER AND METHOD FOR MEASURING TEMPERATURE OF PROBE THEREOF

(71) Applicant: EASYTEM Co., Ltd., Gyeonggi-do (KR)

(72) Inventors: Yun Seong Eo, Gyeonggi-do (KR); Wonil Jang, Gyeonggi-do (KR); Nam Yong Kim, Gyeonggi-do (KR); Eun Seong Kim, Gyeonggi-do (KR); Jaewoo Shin, Seoul (KR)

(73) Assignee: EASYTEM Co., Ltd. (KR)

(*) Notice: Subject to any disclaimer, the term of this patent is extended or adjusted under 35 U.S.C. 154(b) by 127 days.

(21) Appl. No.: 18/556,709

(22) PCT Filed: Feb. 11, 2022

(86) PCT No.: PCT/KR2022/002083
§ 371 (c)(1),
(2) Date: Oct. 23, 2023

(87) PCT Pub. No.: WO2022/225156
PCT Pub. Date: Oct. 27, 2022

(65) Prior Publication Data
US 2024/0204400 A1    Jun. 20, 2024

(30) Foreign Application Priority Data
Apr. 22, 2021  (KR) .................. 10-2021-0052224

(51) Int. Cl.
*H01Q 3/24*    (2006.01)
*G01K 1/02*    (2021.01)
(52) U.S. Cl.
CPC .............. *H01Q 3/24* (2013.01); *G01K 1/026* (2013.01)

(58) Field of Classification Search
CPC ................................. H01Q 3/24; G01K 1/026
See application file for complete search history.

(56) References Cited

U.S. PATENT DOCUMENTS 5,909,963 A * 6/1999 Weiss ................. G01K 7/30
                                                     374/E11.003

FOREIGN PATENT DOCUMENTS

JP    S6223261 B2   5/1987
JP    S62116226 A   5/1987
(Continued)

OTHER PUBLICATIONS

International Search Report issued in PCT/KR2022/002083.

*Primary Examiner* — Henry Luong
(74) *Attorney, Agent, or Firm* — The Belles Group, P.C.

(57) ABSTRACT

A radiometer for a microwave receiver according to an embodiment of the present invention comprises: an antenna line through which radiation power corresponding to the temperature of a probe is received from an antenna; a first reference rod having a first reference temperature fixed in advance; a second reference rod having a second reference temperature fixed in advance; a first microwave switch for selectively switching the antenna line, the first reference load, and the second reference load; a second microwave switch switched with the same clock as the first microwave switch; a demodulator for multiplying a signal output from the second microwave switch by a predetermined gain value and outputting same; an integrator for integrating the signal output from the demodulator; and a controller for measuring the temperature of the probe on the basis of a signal output from the integrator.

6 Claims, 2 Drawing Sheets

(56) References Cited

FOREIGN PATENT DOCUMENTS

| | | | |
|---|---|---|---|
| JP | H07324983 | A | 12/1995 |
| JP | 3084124 | B2 | 9/2000 |
| JP | 3243113 | B2 | 1/2002 |
| KR | 102315222 | B1 | 10/2021 |

* cited by examiner

RADIOMETER FOR MICROWAVE RECEIVER AND METHOD FOR MEASURING TEMPERATURE OF PROBE THEREOF

CROSS-REFERENCE TO RELATED APPLICATIONS

This U.S. non-provisional patent application is a U.S. national stage application under 35 U.S.C. § 371 of PCT Application No. PCT/KR2022/002083, filed Feb. 11, 2022, which claims priority to Korean Patent Application No. 10-2021-0052224, filed on Apr. 22, 2021. The disclosures of the aforementioned priority applications are incorporated herein by reference in their entireties.

TECHNICAL FIELD

The present invention relates to a radiometer for a microwave receiver and a method for measuring a temperature of a probe thereof, and more particularly, to a radiometer for a microwave receiver, which is capable of easily and accurately measuring a temperature of a probe without varying a reference a reference temperature of a reference rod and a method for measuring a temperature of a probe thereof.

BACKGROUND ART

According to Planck's law of blackbody radiation, light radiated from a material, a wavelength of a radio wave, and an amount of a component may be expressed as a function of a temperature. In a microwave frequency range (300 MHz to 300 GHz), according to Rayleigh-Jeans law, a radiation signal is expressed by [Mathematical equation 1] below to have a value proportional to a square of a frequency f and a temperature T. Thus, radiation power Pn in a frequency bandwidth BW received by an antenna is expressed by [Mathematical equation 2] below. When the radiation power received through a microwave receiver by using the [Mathematical equation 2], i.e., noise power is amplified and finally measured, a temperature proportional thereto may be measured, and this is called as a radiometer.

$$B^p(f) = \frac{2hf^3}{c^2}(1 + hf/kT - 1)^{-1} = \frac{2f^2kT}{c^2} \quad \text{[Mathematical equation 1]}$$

(k: Boltzmann constant, c: speed of light in vacuum, T: absolute temperature, f: frequency)

$$P_n = kT\Delta f \quad \text{[Mathematical equation 2]}$$

The radiometer is classified into: a total power radiometer that simply amplifies received radiation power (noise) and measures an output: and a Dicke radiometer having an excellent temperature resolution unlike the total power radiometer.

FIG. 1 is a view for explaining a typical Dicke radiometer and a reception operation principle thereof.

Referring to FIG. 1, in the typical Dicke radiometer, microwave switches 2a and 2b and a demodulator 6 are switched with the same clock. A temperature of an object to be detected is received by a first microwave switch 2a as radiation power corresponding to '$T_A$' through an antenna 1.

Also, reference power corresponding to '$T_{ref}$' of a reference load 3 (Ref. Load) is received by the first microwave switch 2a for comparison with $T_A$. The radiation power corresponding to $T_A$ or the reference power corresponding to $T_{ref}$ is input to the receiver 4 according to switching of the first microwave switch 2a. The receiver 4 processes an input power signal and outputs same to a detector 5, and an output of the detector 5 is input to the second microwave switch 2b.

When the first microwave switch 2a is connected to the antenna 1, the second microwave switch 2b connects the detector 5 to a first amplifier P1 of the demodulator 6. On the other hands, when the microwave switch 2a is connected to a reference load 3, the second microwave switch 2b connects the detector 5 to a second amplifier P2 of the demodulator 6. Here, the first amplifier P1 and the second amplifier P2 have the same gain and opposite polarities +A and −A. Also, '$C_d$' is a detector constant of the detector 5.

The demodulator 6 outputs the output of the first amplifier P1 and the second amplifier (P2) to an integrator 7, and the output voltage $V_{out}$ of an integrator 7 is input to the controller 8.

The radiation power corresponding to $T_A$ during a half cycle $T_1$ and the reference power corresponding to the $T_{ref}$ during a remaining half-cycle $T_2$ is input to the integrator 7. The output voltage $V_{out}$ of the integrator 7 becomes '$kBG_{RX}C_DA_{r0}(T_A-T_{ref})$' when passes through the integrator 7. Here, when $T_A$ equals to $T_{ref}$, the output voltage $V_{out}$ becomes '0'. Since the output voltage of the typical Dicke radiometer is proportional to $(T_A-T_{ref})$ unlike the total power radiometer, the typical Dicke radiometer may have $T_{RX}$ of the receiver 4 that is not affected, be insensitive to change of a gain $G_{RX}$ of the receiver 4, and also obtain $T_A$ to be measured by controlling the $T_{ref}$.

However, the typical Dicke radiometer controls '$T_{ref}$' for measuring of a temperature of a probe to be measured, i.e., '$T_A$' corresponding to the radiation power input through the antenna 1, and this controlling is substantially difficult and complicated to be implemented. Specifically, the typical Dicke radiometer finds a moment of matching with the $T_A$ by varying the equivalent temperature $T_{ref}$ or resistance of the reference rod 3, and the moment is when the output voltage $V_{out}$ of the integrator 7 becomes '0'. However, the moment in which the varied $T_{ref}$ is hard to find, and the variable $T_{ref}$ is not easy to create. Therefore, a radiometer capable of measuring the temperature of the probe more easily and accurately is required.

DISCLOSURE OF THE INVENTION

Technical Problem

The present invention provides a radiometer for a microwave receiver, which is capable of easily and accurately measuring a temperature of a probe to be measured and a method for measuring a temperature of a probe thereof.

Technical Solution

Embodiments of the present invention provide a radiometer for a microwave receiver, including: an antenna line through which radiation power corresponding to a temperature of a probe is received from an antenna: a first reference rod having a first reference temperature fixed in advance: a second reference rod having a second reference temperature fixed in advance; a first microwave switch for selectively switching the antenna line, the first reference load, and the second reference load; a second microwave switch switched with the same clock as the first microwave switch; a demodulator for multiplying a signal output from the second microwave switch by a predetermined gain value and outputting same: an integrator for integrating a signal output from the demodulator; and a controller for measuring the temperature of the probe based on a signal output from the integrator.

In other embodiments of the present invention, a method for measuring a temperature of a probe of a radiometer for a microwave receiver includes: a first switching step in which the first microwave switch is alternately switched between the antenna line and the first reference load according to the clock: a second switching step in which the first microwave switch is alternately switched between the antenna line and the second reference load according to the clock: and a measuring step of measuring the temperature of the probe based on a first output voltage output from the integrator by the first switching step and a second output voltage output from the integrator by the second switching step.

Advantageous Effects

The radiometer for the microwave receiver according to the embodiment of the present invention may easily and accurately measure the temperature of the probe.

Particularly, the radiometer may measure the temperature of the probe through the easy and simple calculation by using the two reference temperatures fixed at the specific values without varying and controlling the reference temperature of the reference rod in comparison with the typical Dicke radiometer.

MODE FOR INVENTION

Figure 1:
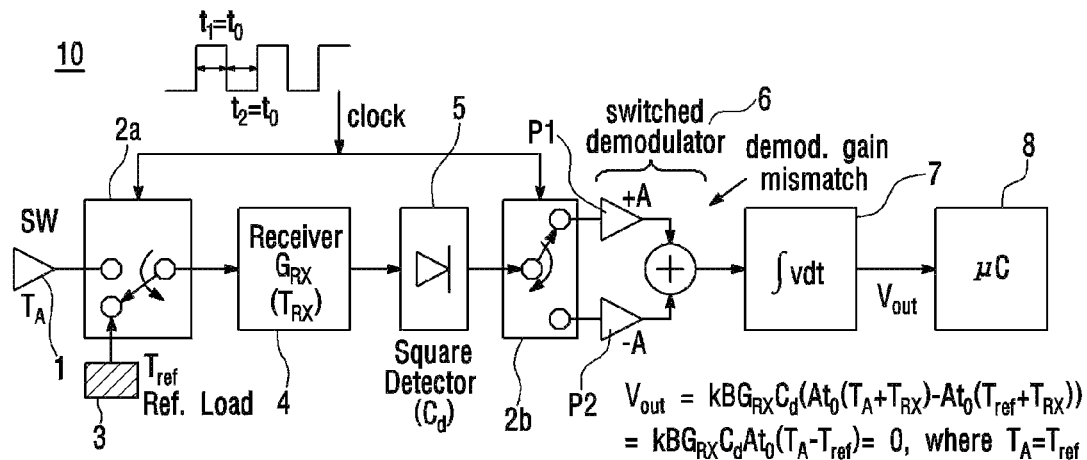
FIG. 1 is a view for explaining a typical Dicke radiometer and a reception operation principle thereof.

Hereinafter, the present invention may be best appreciated by referring to the following detailed description of preferred embodiments with reference to the accompanying drawings. In the drawings, like reference numerals refer to like elements throughout, and redundant descriptions will be omitted. Moreover, detailed descriptions related to well-known functions or configurations will be ruled out in order not to unnecessarily obscure subject matters of the present invention. In the following description, the technical terms are used only for explain a specific exemplary embodiment while not limiting the present invention. In addition, the principle, viewpoint, and embodiments of the present invention and all detailed descriptions of specific embodiments should be understood to be intended to include the structural and functional equivalents of the matter.

Figure 2:
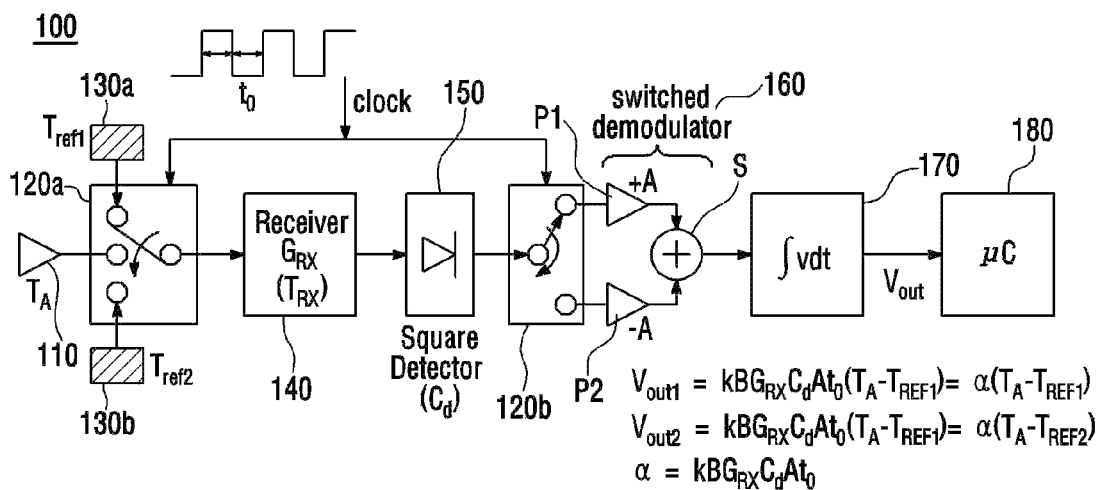
FIG. 2 is a view illustrating a radiometer for a microwave receiver according to an embodiment of the present invention.

FIG. 2 is a view illustrating a radiometer for a microwave receiver according to an embodiment of the present invention.

Referring to FIG. 2, the radiometer for the microwave receiver according to an embodiment of the present invention includes two reference rods 130a and 130b in comparison with a typical Dicke radiometer illustrated in FIG. 1, and a first microwave switch 120a of the radiometer electrically connects one of an antenna 110, a first reference load 130a, and a second reference load 130b to a receiver 140 according to switching.

More specifically, the radiometer according to an embodiment of the present invention includes an antenna 110, microwave switches 120a and 120b, first and second reference loads 130a and 130b, a receiver 140, a detector 150, a demodulator 160, an integrator 170, and a controller 180.

The microwave switches 120a and 120b include a first microwave switch 120a and a second microwave switch 120b. The first microwave switch 120a and the second microwave switch 120b are switched with the same clock.

The first microwave switch 120a is electrically connected to an antenna line and each of the first and second reference rods 130a and 130b. Also, the first microwave switch 120a is electrically connected to the receiver 140. Here, the antenna line represents a path electrically connected to the antenna 110. Components except for the antenna 110 may be disposed on the line.

The first microwave switch 120a may include a first terminal electrically connected to the antenna line, a second terminal electrically connected to the first reference load 130a, a third terminal electrically connected to the second reference load 130b, and a fourth terminal electrically connected to the receiver 140.

The first microwave switch 120a electrically connects one of the antenna 110, the first reference load 130a, and the second reference load 130b to the receiver 140 according to switching. When the first microwave switch 120a electrically connects the antenna line to the receiver 140, radiation power corresponding to a temperature $T_A$ of a probe is transmitted from the antenna 110 to the receiver 140 through the antenna line. On the other hand, when the first microwave switch 120a electrically connects the first reference load 130a to the receiver 140, first reference power corresponding to a first reference temperature $T_{ref1}$ is input to the receiver 140, and when the first microwave switch 120a electrically connects the second reference load 130b to the receiver 140, second reference power corresponding to a second reference temperature $T_{ref2}$ is input to the receiver 140.

The receiver 140 may be a super heterodyne receiver having a bandwidth B and a total power gain $G_{RX}$.

The receiver 140 processes a signal input from the first microwave switch 120a. For example, the receiver 140 may predetect one of a power signal input by switching of the first microwave switch 120a, radiation power corresponding to the temperature $T_A$ from the antenna 110, first reference power corresponding to the first reference temperature $T_{ref1}$ from the first reference load 130a, and second reference power corresponding to the second reference temperature $T_{ref2}$ from the second reference load 130b.

The detector 150 may be a square-law detector that outputs a signal proportional to a square of an amplitude of the signal input from the receiver 140, and include a semiconductor diode.

The second microwave switch 120b is connected between the detector 150 and the demodulator 160. The second microwave switch 120b electrically connects the detector 150 to a first amplifier P1 or a second amplifier P2 according to switching. The second microwave switch 120b has a first output terminal connected to the first amplifier P1 and a second output terminal connected to the second amplifier P2.

The demodulator 160 includes the first amplifier P1, second amplifier P2, and a combiner S. The first amplifier P1 and the second amplifier P2 have the same gain while having opposite polarities +A and −A and are each electrically connected to the second microwave switch 120b. Outputs of the first amplifier P1 and the second amplifier P2 are added and output by the combiner S.

The integrator 170 accumulates signals input from the demodulator 160 for a predetermined time to transmit a predetermined output voltage to the controller 180.

The controller 180 may measure the temperature $T_A$ of the probe based on the output voltage from the integrator 170. A specific method for measuring the temperature $T_A$ of the probe will be described in detail below.

Hereinafter, a method for measuring the temperature $T_A$ of the probe by the radiometer for the microwave receiver according to an embodiment of the present invention in FIG. 2 will be described with reference to FIG. 3.

Figure 3:
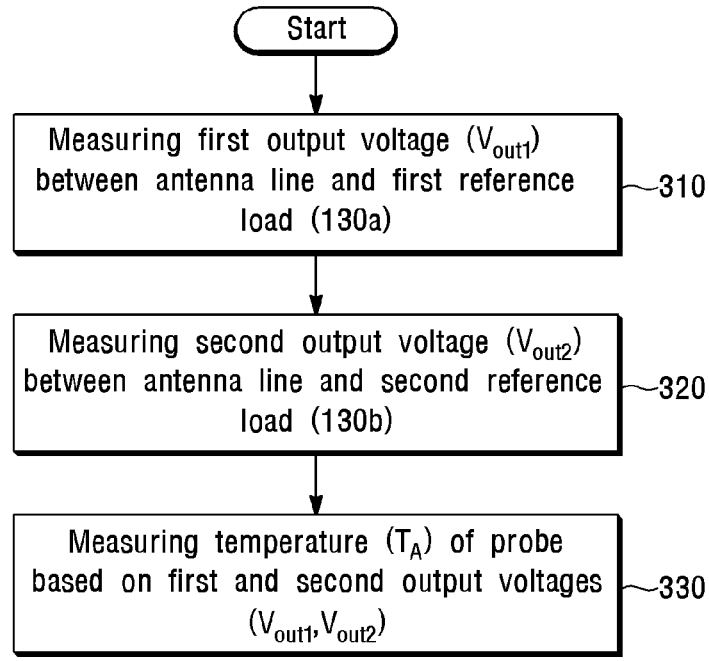
FIG. 3 is a flowchart representing a method for measuring a temperature $T_A$ of a probe of a radiometer for a microwave receiver according to an embodiment of the present invention in FIG. 2.

FIG. 3 is a flowchart representing the method for measuring the temperature $T_A$ of the probe of the radiometer for the microwave receiver according to an embodiment of the present invention in FIG. 2.

The method for measuring the temperature $T_A$ of the probe of the radiometer for the microwave receiver according to an embodiment of the present invention uses the first reference temperature $T_{ref1}$ and the second reference temperature $T_{ref2}$, which are fixed at specific values.

Referring to FIG. 3, the method for measuring the temperature $T_A$ of the probe of the radiometer for the microwave receiver according to an embodiment of the present invention includes: a step 310 of measuring a first output voltage $V_{out1}$ between the antenna line and the first reference load 130a: a step 320 of measuring a second output voltage $V_{out2}$ between the antenna line and the second reference load 130b; and a step 330 of measuring the temperature $T_A$ of the probe based on the measured first and second output voltages.

The step 310 of measuring the first output voltage $V_{out1}$ between the antenna line and the first reference load 130a will be described. When as the first and second microwave switches 120a and 120b are switched with the same clock, the first microwave switch 120a alternately switches the antenna 110 and the first reference load 130a, and the second microwave switch 120b alternately switches the first amplifier P1 and the second amplifier P2 of the demodulator 160, the first output voltage $V_{out1}$ of the integrator 170 is expressed by [Mathematical equation 3] below.

$$V_{out1} = kBG_{RX}C_d At_0(T_A - T_{ref1}) = \alpha(T_A - T_{ref1})$$ [Mathematical equation 3]

Here, K is a Boltzmann constant, B is a bandwidth of the receiver, $G_{RX}$ is a gain of the receiver, $C_d$ is a detector constant, A is a gain of the first and second amplifier, and to is a half-cycle time of clock.

Next, the step 320 of measuring the second output voltage $V_{out2}$ between the antenna line and the second reference load 130b will be described. When as the first and second microwave switches 120a and 120b are switched with the same clock, the first microwave switch 120a alternately switches the antenna 110 and the second reference load 130b, and the second microwave switch 120b alternately switches the first amplifier P1 and the second amplifier P2 of the demodulator 160, the second output voltage $V_{out2}$ of the integrator 170 is expressed by [Mathematical equation 4] below.

$$V_{out2} = kBG_{RX}C_d At_0(T_A - T_{ref2}) = \alpha(T_A - T_{ref2})$$ [Mathematical equation 4]

Lastly, the step 330 of measuring the temperature $T_A$ of the probe based on the measured first and second output voltages $V_{out1}$ and $V_{out2}$ will be described. A ratio of the first output voltage $V_{out}$ of the [Mathematical equation 3] and the second output voltage $V_{out2}$ of the [Mathematical equation 4] is shown in [Mathematical equation 5] below.

$$\frac{V_{out1}}{V_{out2}} = \frac{(T_A - T_{ref1})}{(T_A - T_{ref2})}$$ [Mathematical equation 5]

The [Mathematical equation 5] is summarized by the temperature $T_A$ of the probe to be measured and expressed into [Mathematical equation 6] below.

$$T_A = \frac{[T_{ref1}(V_{out2}/V_{out1}) - T_{ref2}]}{[(V_{out2}/V_{out1}) - 1]}$$ [Mathematical equation 6]

When the temperature $T_A$ of the probe is calculated by the [Mathematical equation 6], unnecessary a may be removed. That is, the temperature $T_A$ of the probe may be easily and accurately measured based on the two reference temperatures $T_{ref1}$ and $T_{ref2}$ fixed at specific values and the measured two first and second output voltages $V_{out1}$ and $V_{out2}$.

Figure 4:
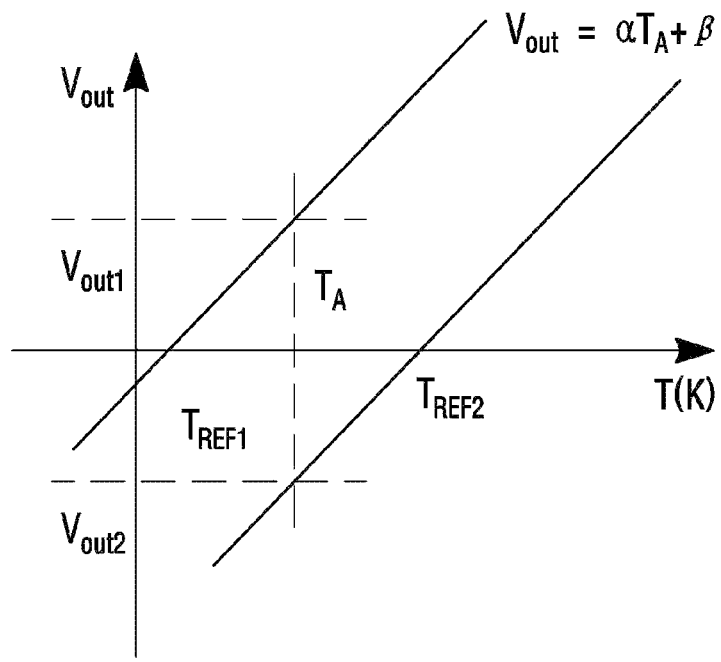
FIG. 4 is a graph showing the method for measuring the temperature $T_A$ of the probe of the radiometer for the microwave receiver according to an embodiment of the present invention in FIG. 2.

FIG. 4 is a graph showing the method for measuring the temperature $T_A$ of the probe of the radiometer for the microwave receiver according to an embodiment of the present invention in FIG. 2.

As shown in the graph of FIG. 4, although the $T_A$ may be measured when an inclination a of a linear function on $V_{OUT}$ is known, the $T_A$ may not be measured by measuring only one reference temperature. Thus, by using the radiometer according to an embodiment of the present invention in FIG. 2, the temperature $T_A$ of the probe may be accurately measured from the two reference temperatures $T_{ref1}$ and $T_{ref2}$ and the output voltages $V_{out1}$ and $V_{out2}$ of each of the two reference temperatures $T_{ref1}$ and $T_{ref2}$. The radiometer according to an embodiment of the present invention may be unnecessary to control and vary the reference temperature of the reference load to measure the temperature $T_A$ of the probe and easily and accurately measure the temperature $T_A$ of the probe regardless of characteristics of inner component the radiometer, i.e., the bandwidth B of the receiver 140, a detector constant $C_d$ of the detector 150, and the gains and polarities of the first and second amplifiers P1 and P2.

On the other hand, the above-described method for measuring the temperature of the probe of the radiometer for the microwave receiver may be realized in the form of a program command implemented through various computer units and recorded in computer readable media. The computer readable recording media may include a program command, a data file, and a data structure or a combination thereof. The program command recorded in the above-described media may be particularly designed and configured for the present invention or may be well-known and used to those skilled in computer software. The computer readable recording media include e.g, magnetic media such as a hard disk, a floppy disk, and a magnetic tape, optical media such as CD-ROM and DVD, magneto-optical media such as a floptical disk, and a hardware device that is specially configured to store and perform a program command such as ROM, RAM, and a flash memory. The program command includes, e.g., a high language code that is executed by a computer using an interpreter as well as a machine code such as a compiler. The hardware device may be configured to operate one or more software modules to perform operations of the present invention, and vice versa.

Although a preferred embodiment of the present invention has been disclosed, various changes and modifications may be made thereto by one skilled in the art without departing from the scope and spirit of the invention as set forth in the appended claims. It is also understood that the terms used herein are merely descriptive, rather than limiting, and that various changes may be made without departing from the scope and spirit of the invention.

DESCRIPTION OF REFERENCE NUMERAL

110: Antenna
120a: First microwave switch
120b: Second microwave switch
130a: First reference rod
130b: Second reference rod
140: Receiver
150: Detector
160: Demodulator
170: Integrator
180: Controller

The invention claimed is:

1. A radiometer for a microwave receiver, comprising:
an antenna line through which radiation power corresponding to a temperature of a probe is received from an antenna;
a first reference rod having a first reference temperature fixed in advance;
a second reference rod having a second reference temperature fixed in advance;
a first microwave switch for selectively switching the antenna line, the first reference load, and the second reference load;
a second microwave switch switched with the same clock as the first microwave switch;
a demodulator for multiplying a signal output from the second microwave switch by a predetermined gain value and outputting same;
an integrator for integrating a signal output from the demodulator; and
a controller for measuring the temperature of the probe based on a signal output from the integrator.

2. The radiometer of claim 1, wherein the signal output from the integrator comprises:
a first output voltage based on a feature in which the first microwave switch alternately switches the antenna line and the first reference load; and
a second output voltage based on a feature in which the first microwave switch alternately switches the antenna line and the second reference load,
wherein the temperature of the probe is measured based on the first and second reference temperatures and the first and second output voltages.

3. The radiometer of claim 2, wherein the temperature of the probe is determined by the Mathematical equation below $$T_A = \frac{[T_{ref1}(V_{out2}/V_{out1}) - T_{ref2}]}{[(V_{out2}/V_{out1}) - 1]}$$

Here, $T_A$ is the temperature of the probe, $T_{ref1}$ is the first reference temperature, $T_{ref2}$ is the second reference temperature, $V_{out1}$ is the first output voltage, and the $V_{out2}$ is the second output voltage.

4. The radiometer of claim 1, further comprising a receiver and a detector disposed between the first microwave switch and the second microwave switch,
wherein the demodulator comprises:
a first amplifier connected to a first output terminal of the second microwave switch;
a second amplifier connected to a second output terminal of the second microwave switch; and
a combiner configured to add output signals of the first amplifier and the second amplifier,
wherein the first amplifier and the second amplifier have the same gain and opposite polarities.

5. A method for measuring the temperature of the probe of the radiometer for the microwave receiver of claim 1, comprising:
a first switching step in which the first microwave switch is alternately switched between the antenna line and the first reference load according to the clock;
a second switching step in which the first microwave switch is alternately switched between the antenna line and the second reference load according to the clock; and
a measuring step of measuring the temperature of the probe based on the first output voltage output from the integrator by the first switching step and the second output voltage output from the integrator by the second switching step.

6. The method of claim 5, wherein the temperature of the probe is determined by the Mathematical equation below $$T_A = \frac{[T_{ref1}(V_{out2}/V_{out1}) - T_{ref2}]}{[(V_{out2}/V_{out1}) - 1]} <$$

Here, TA is the temperature of the probe, Tref1 is the first reference temperature, Tref2 is the second reference temperature, Vout1 is the first output voltage, and the Vout2 is the second output voltage.

* * * * *